US010082667B2

(12) United States Patent
Truscott et al.

(10) Patent No.: US 10,082,667 B2
(45) Date of Patent: Sep. 25, 2018

(54) LASER IMAGING SYSTEM WITH ADJUSTABLE OPTICAL ELEMENT MOUNTING FIXTURE AND RELATED METHODS

(71) Applicant: Harris Corporation, Melbourne, FL (US)

(72) Inventors: Anthony D. Truscott, San Diego, CA (US); Bradley Charles Steele, San Diego, CA (US)

(73) Assignee: HARRIS CORPORATION, Melbourne, FL (US)

( * ) Notice: Subject to any disclaimer, the term of this patent is extended or adjusted under 35 U.S.C. 154(b) by 571 days.

(21) Appl. No.: 14/703,035

(22) Filed: May 4, 2015

(65) Prior Publication Data
US 2016/0327785 A1 Nov. 10, 2016

(51) Int. Cl.
G01C 3/08 (2006.01)
G02B 27/00 (2006.01)
G02B 5/32 (2006.01)
G01S 17/89 (2006.01)
G01S 7/481 (2006.01)

(52) U.S. Cl.
CPC ........ G02B 27/0031 (2013.01); G01S 7/4817 (2013.01); G01S 17/89 (2013.01); G02B 5/32 (2013.01)

(58) Field of Classification Search
CPC ..... G02B 27/0031; G02B 5/32; G01S 7/4817; G01S 17/89
See application file for complete search history.

(56) References Cited

U.S. PATENT DOCUMENTS

| | | | |
|---|---|---|---|
| 4,311,384 A | 1/1982 | Keene | |
| 4,311,385 A | 1/1982 | Keene | |
| 4,326,799 A | 4/1982 | Keene et al. | |
| 4,515,472 A | 5/1985 | Welch | |
| 4,810,088 A | 3/1989 | Karning et al. | |
| 5,000,567 A | 3/1991 | Fleshner | |
| 5,841,567 A * | 11/1998 | Squires | B41B 19/00 359/204.1 |
| 6,147,747 A | 11/2000 | Kavaya et al. | |
| 6,192,196 B1 * | 2/2001 | Keller | G03B 7/099 396/20 |
| 6,650,407 B2 | 11/2003 | Jamieson et al. | |
| 8,752,969 B1 * | 6/2014 | Kane | G02B 7/1821 356/139.05 |
| 2004/0189969 A1 * | 9/2004 | Mizuno | G02B 7/023 355/67 |
| 2006/0227317 A1 | 10/2006 | Henderson et al. | |

(Continued)

FOREIGN PATENT DOCUMENTS

EP 0 173 617 8/1989

*Primary Examiner* — Samantha K Abraham
(74) *Attorney, Agent, or Firm* — Allen, Dyer, Doppelt + Gilchrist, P.A.

(57) ABSTRACT

A laser imaging system may include a laser source, a laser receiver, a rotatable base defining a rotation axis, and an optical element (OE) carried by the rotatable base in an optical path between the laser source and laser receiver. An adjustable OE mounting fixture may mount the OE to be adjustably movable with respect to the rotatable base in a plane transverse to the rotation axis. A controller may be configured to adjust the adjustable OE mounting fixture to provide scan angle compensation.

28 Claims, 6 Drawing Sheets

(56) References Cited

U.S. PATENT DOCUMENTS

| | | | |
|---|---|---|---|
| 2008/0170303 A1* | 7/2008 | Bieg | G02B 7/005 |
| | | | 359/811 |
| 2009/0123158 A1 | 5/2009 | Ray et al. | |
| 2009/0219634 A1* | 9/2009 | Blanding | G02B 7/023 |
| | | | 359/823 |
| 2015/0029571 A1 | 1/2015 | Steele et al. | |

* cited by examiner

LASER IMAGING SYSTEM WITH ADJUSTABLE OPTICAL ELEMENT MOUNTING FIXTURE AND RELATED METHODS

TECHNICAL FIELD

The present invention relates to the field of remote sensing devices, and more particularly, to laser based 3D imaging systems.

BACKGROUND

Remote sensing systems are used to acquire information about an object or target without making physical contact with the object. For example, optical sensing systems, such as Light Detecting and Ranging (LIDAR) systems, use reflected light to determine ranges to targets, as well as to perform imaging or mapping of the target terrain. LIDAR systems may be carried by an airborne platform (e.g., airplanes, satellites, etc.) to capture optical image data from overhead (e.g., nadir looking) views of a geographical area of interest. The raw image data captured using LIDAR, etc., may be processed into a desired format, such as a digital elevation model (DEM), for example.

Some LIDAR systems include an active illumination system which includes components to scan a laser (or other light source) beam over a target area. Such a configuration may be desirable in that increasing the speed of a scanner increases the area coverage rate of a sensor, thereby reducing operating costs. One example of a LIDAR system employing one or more rotating optical elements (e.g., mirrors, glass wedge (Risley) prisms or holographic optical elements (HOEs)) is the High Resolution Quantum LIDAR System (HRQLS) from Sigma Space Corporation of Lanham, Md. This system employs a pair of monolithic rotating glass Risley prisms. Another example is the Georgia Tech Research Institute (GTRI) bathometric LIDAR. This system employs a single rotating HOE with a fixed glass optical element for the transmit channel.

Despite the existence of such configurations, further enhancements for optical and laser imaging systems may be desirable in some applications.

SUMMARY

An imaging system may include a light (e.g., laser) source, a light (e.g., laser) receiver, a rotatable base defining a rotation axis, and an optical element (OE) carried by the rotatable base in an optical path between the light source and light receiver. An adjustable OE mounting fixture may mount the OE to be adjustably movable with respect to the rotatable base in a plane transverse to the rotation axis. A controller may be configured to adjust the adjustable OE mounting fixture to provide scan angle compensation.

More particularly, the OE may be aligned along an optical path segment from the light source. Furthermore, the light source and the light receiver may be in a coaxial arrangement.

The rotatable base may have an opening therein, and the adjustable OE mounting fixture may include a collar carried by the rotatable base within the opening thereof and configured to hold the OE therein, and a flexure mount carried by the rotatable base adjacent the opening and coupled to the collar. Furthermore, the flexure mount may include a solid monolithic body having a proximal end coupled to the rotatable base, a distal end coupled to the collar, and an intermediate portion having a reduced thickness providing flexibility for the flexure mount.

In addition, the adjustable OE mounting fixture may further include an arm coupled to the collar opposite the flexure mount, and an actuator carried by the rotatable base and coupled to the arm. The imaging system may also include a position sensor system carried by the rotatable base and configured to sense a position of the collar. More particularly, the position sensor system may include a main reflector carried by the collar, a reference laser carried by the rotatable base for directing a reference laser beam at the main reflector, and a linear detector array carried by the rotatable base for receiving reflected laser light from the main reflector and coupled to the controller. Additionally, at least one secondary reflector may also be carried by the rotatable base and in an optical path between the reference laser and the linear detector. The additional reflectors may be used to increase the optical path length between the reference laser and the linear detector, thus increasing the linear motion of the laser reference on the linear detector for a given angular offset at the main reflector mounted to the flexure mount. The imaging system may also include an inductive power interface carried by the rotatable base.

A method for using an imaging system, such as the one described briefly above, is also provided. The method may include operating the light source and light receiver, and adjusting the adjustable OE mounting fixture to adjustably move the OE with respect to the rotatable base in the plane transverse to the rotation axis to thereby provide scan angle compensation between the light source and light receiver.

DETAILED DESCRIPTION OF THE EMBODIMENTS

The present invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in different embodiments.

Figure 1:
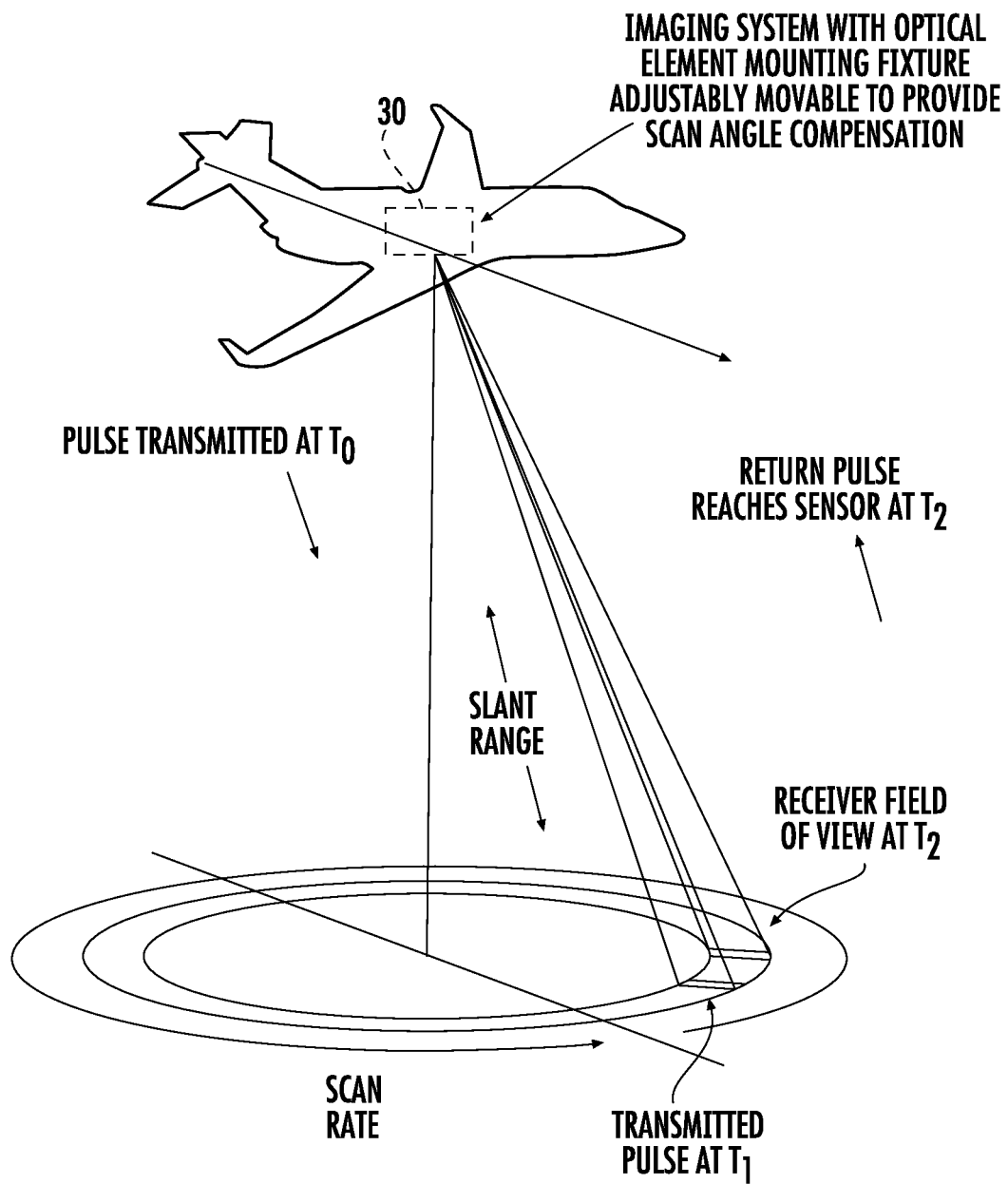
FIG. 1 is a schematic diagram of a laser imaging system in accordance with an example aspect carried by an airborne platform.
Figure 2:
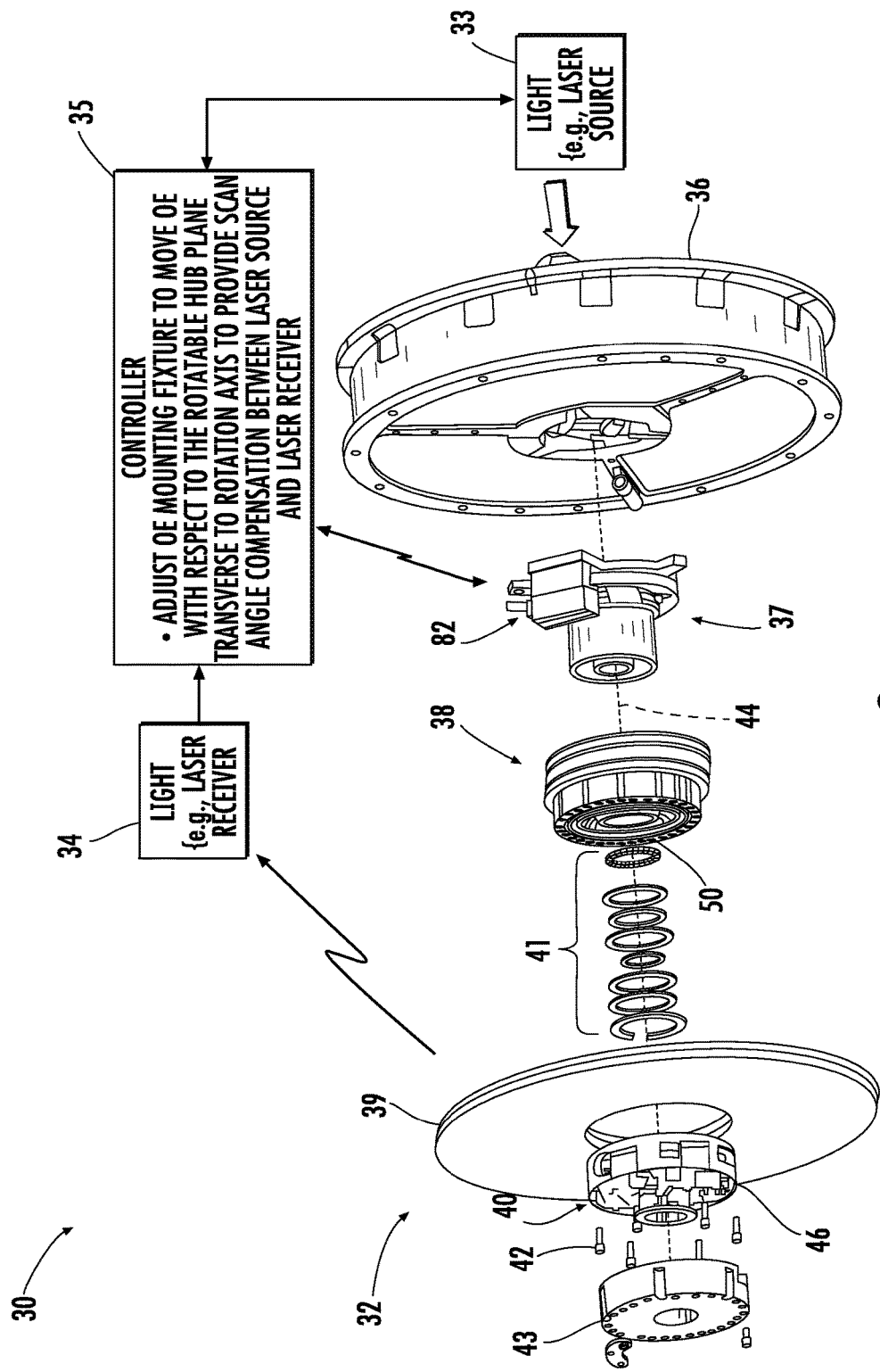
FIG. 2 is an exploded view of a rotating optical assembly and associated optical and control components which may be used in the laser imaging system of FIG. 1.
Figure 3:
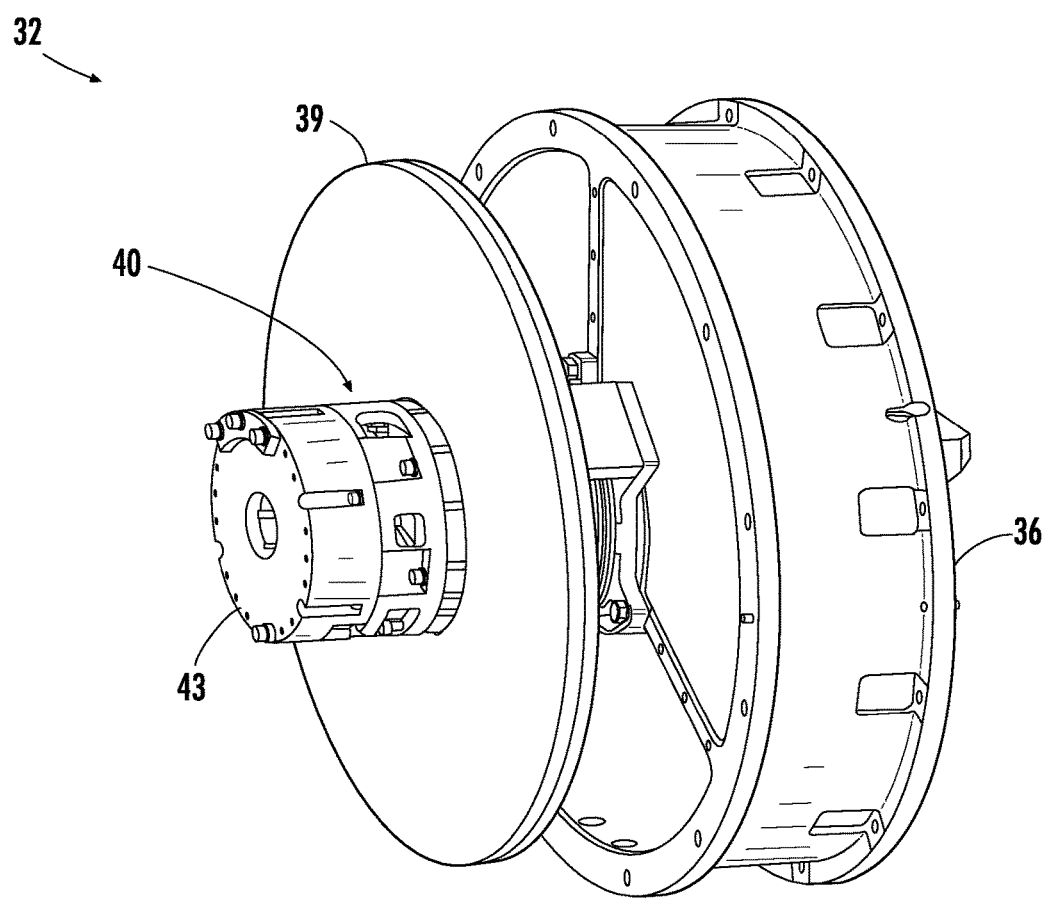
FIG. 3 is a perspective view of the rotating optical assembly of FIG. 2 when fully assembled.
Figure 4:
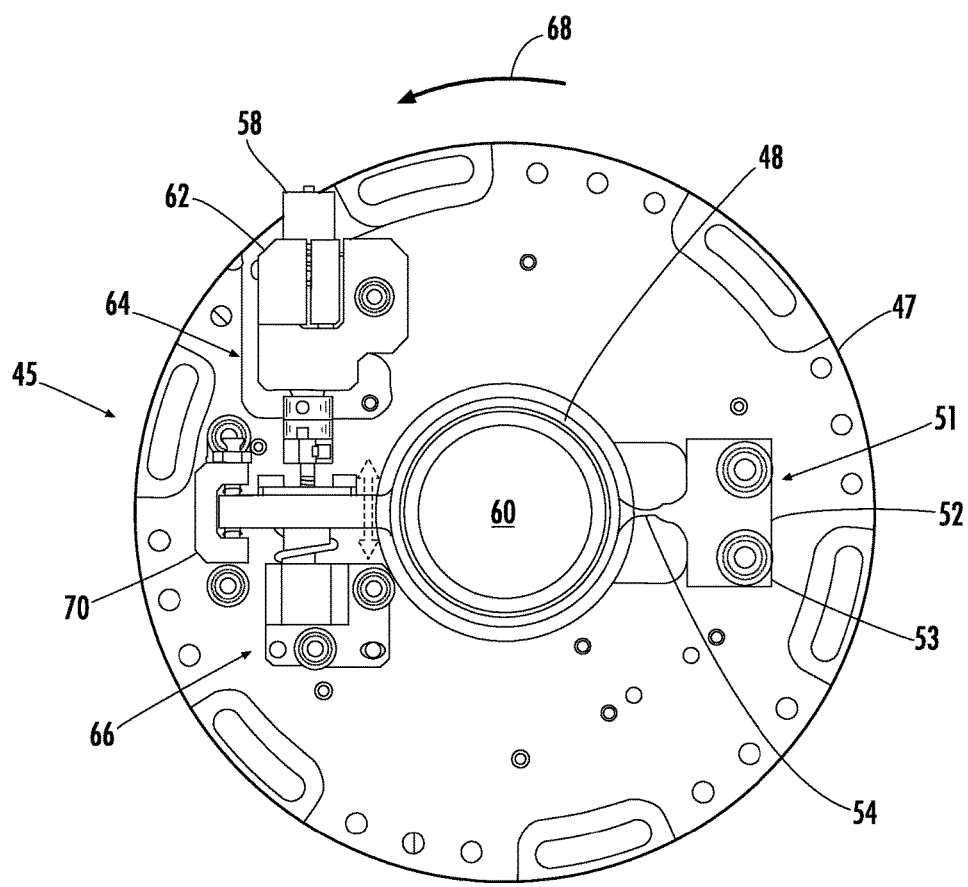
FIG. 4 is an enlarged plan view of a front side of a rotatable base with an adjustable optical element mounting fixture thereon which may be used with the rotating optical assembly of FIG. 3.
Figure 5:
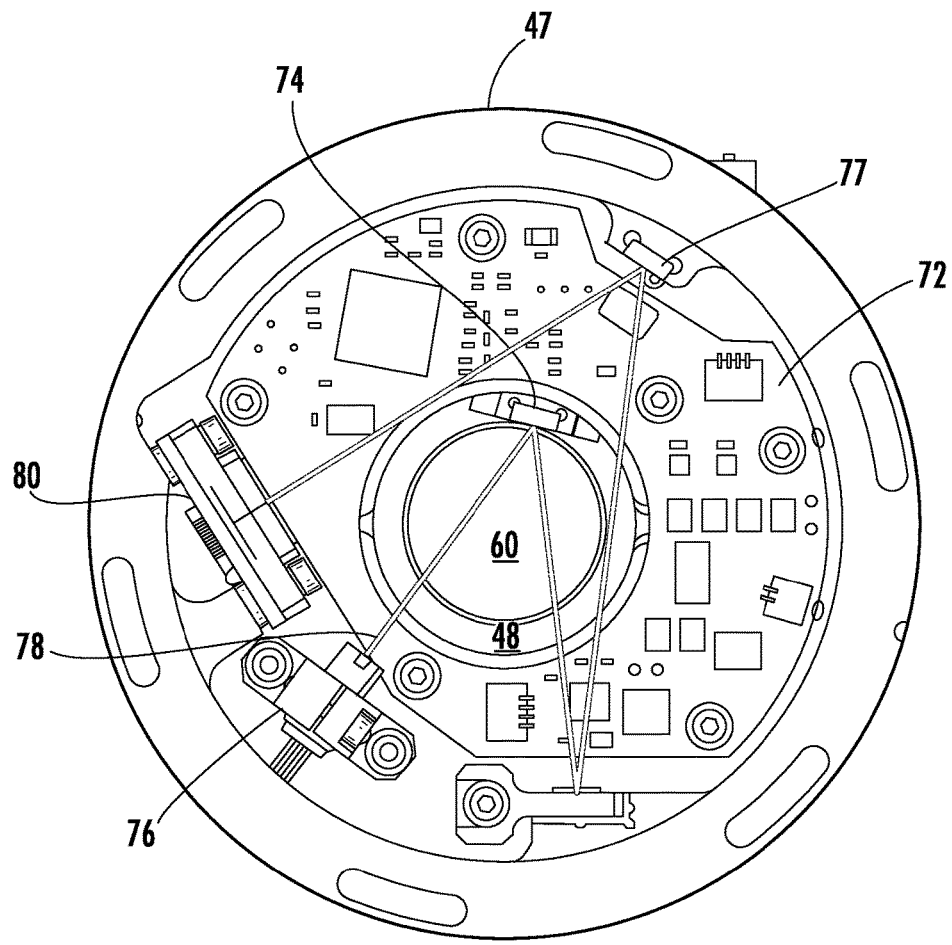
FIG. 5 is an enlarged plan view of a back side of the rotatable base of FIG. 4 with a position sensor system and associated circuit board for the position sensor system and the adjustable OE mounting fixture carried thereon.

Referring initially to FIG. 1, a laser imaging system 30 in accordance with an example embodiment is first described. In the illustrated example, the laser imaging system 30 is carried by an airborne platform, here an airplane 31, although other platforms (e.g., satellites, helicopters, UAV's, etc.) may also be used. With respect to typical active imaging systems including a single or multiple optical elements with a common rotational axis, such as the above-described LIDAR systems, problems may arise with increasing scan rates. More particular, as the rotational speed of the element(s) increases and/or the slant range of the common line of sight (LOS) increases, as seen in FIG. 1, at some point the round trip time of a imaging pulse (i.e., from the time of transmission ($t_0$) to the time of reception ($t_2$)) will increase to the point that the optical receiver will no longer be pointed at the area illuminated by the transmitted pulse when the returning transmitted pulse reaches the sensor. As a result, despite the existence of a rotating scanner to increase coverage area, systems such as the above-noted LIDAR systems may still either have to operate at a relatively low altitude or a relatively low scan rate to keep the transmit and receive channels in synchronization.

Referring additionally to FIGS. 2-6, the system 30 may advantageously provide for real-time adjustment of transmit and/or receive optics to account for LOS differences in the transmit and receive channels of a laser scanner 32. In the illustrated example, the laser imaging system 30 includes a laser source 33, a laser receiver 34, the laser scanner 32, and a controller 35 coupled with the laser source, laser receiver, and laser scanner. The controller 35 may be implemented using appropriate hardware (e.g., a microprocessor, etc.) and associated non-transitory computer-readable medium having computer-executable instructions for causing the controller to perform the operations noted herein.

The laser scanner 32 illustratively includes a spider scanner mount 36, a scanner stator assembly 37 coupled to the spider scanner mount, and a hub assembly 38 rotationally mounted on the scanner stator assembly. A laser receiving optical element (OE) 39 (here, a holographic beam steering optical element) and a clocking mechanism 40 are coupled to the hub assembly 38 with a series of components 41 including washers, retaining rings, and a spring, as well as with bolts 42 (although other coupling configurations may be used in different embodiments). A cover 43 is also provided for the clocking mechanism 40. The clocking mechanism 40 includes an adjustable OE mounting fixture 45 which is carried by a housing 46, as will be described further below.

The rotatable hub 38 defines a rotation axis 44, and a transmit OE 60 (see FIG. 6) is carried by the adjustable OE mounting fixture 45 so that the transmit OE is in the optical path between the laser source 33 and laser receiver 34, along with the receive OE 39. Moreover, the laser source 33 and laser receiver 34 may be in a coaxial arrangement, as in the illustrated embodiment. While the transmit OE 60 is illustratively shown as a single refractive wedge prism optical element herein, in some embodiments a single holographic wedge element or multiple holographic or wedge elements may used in series, for example.

The adjustable OE mounting fixture 45 is positioned on a base 47 (here a circular substrate) carried within the housing 46. The adjustable OE mounting fixture 45 further illustratively includes a collar 48 carried by the base 47 and extending through an opening in the base which is aligned with an opening 50 in the rotating hub assembly 38. The collar 48 is configured to hold the transmit OE 60 therein, and a flexure mount 51 is carried by the base 47 adjacent the opening 50 and coupled to the collar 48. The flexure mount 51 illustratively includes a solid monolithic body 52 having a proximal end coupled to the base 47 (by bolts 53 in the illustrated example), a distal end coupled to the collar 48, and an intermediate portion 54 (also referred to as a "flexure hinge" herein) having a reduced thickness providing flexibility for the flexure mount. It is the thin section of the intermediate portion 54 (e.g. circular contour flexure or perforated hinge flexure) that determines the center of rotation for the flexure mount.

The adjustable OE mounting fixture 45 further illustratively includes an arm 56 coupled to the collar 48 opposite the flexure mount 51, and an actuator assembly carried by the base 47 and coupled to the arm. More particularly, the actuator assembly in the present example illustratively includes a gear motor 58, a motor mount 62 for the gear motor carried by the base 47, a shaft coupler 64 which is driven by the gear motor, and a preload block 66 carried by the base on an opposite side of the arm 56. The collar 48 and arm 56 are also formed as an integral body (i.e., a single piece) with the monolithic body 52 and intermediate portion 54 in the illustrated example, although this is not required in all configurations).

The drive motor and gear box, or gear motor, 58 and preload block 66 cooperate to move the arm 56 up and down (as indicated by the double-headed dashed arrow), which in turn moves the collar 48 (and thus the transmit optical element 60) relative to the rotating base 47 (base rotation is indicated by the arrow 68 in FIG. 4) in a plane transverse to the rotation axis 44. In the illustrated example, the base 47 is a separate component that is fixedly mounted to the hub 38 and accordingly rotates at the same speed as the hub, but in other embodiments the base and hub may be integrally formed or a single unit. In the illustrated example, the collar 48 is orthogonal to the rotation axis 44, and the plane through which the transmit optical element 60 rotates is therefore perpendicular to the rotation axis 44, but in other embodiments the collar could be canted with respect to the rotation axis (i.e., non-orthogonal), if desired. The adjustable OE mounting fixture 45 further illustratively includes a flexure hard stop 70, which may optionally be included to limit the amount of travel the arm 56 can move. By way of example, the present configuration is configured to provide for ±6 miliradians from a central starting position of the arm 56, but smaller or greater ranges may also be used. Furthermore, the gear motor 58 configuration may allow for adjustments with a granularity on the order of several microradians (e.g., 10 microradians), although different adjustment increments may also be used.

A circuit board 72 and associated circuitry for controlling the gear motor 58 are carried by the base 47 on an opposite (back) side thereof. Along with the circuit board 72, a position sensor system is also carried on the back side of the base 47, which is configured to sense a position of the collar 48. More particularly, the position sensor system illustratively includes a main reflector 74 (e.g., a mirror) carried by the collar 48, a reference laser 76 carried by the base for directing a reference laser beam 78 at the main reflector, and a linear detector array 80 carried by the base for receiving reflected laser light from the main reflector.

The linear detector array 80 provides feedback to the controller 35, which is used in adjusting the position of the collar 48 (and, accordingly, the transmit OE 60). In the present example, a plurality of secondary reflectors 77 are also carried by the base 47 and in the optical path between the reference laser 76 and the linear detector 80, which provides a greater optical path length, as will be appreciated by those skilled in the art. However, different numbers of secondary reflectors (or none at all) may be used in other embodiments. Furthermore, other types of position feedback sensor arrangements may used in different embodiments as well, as will also be appreciated by those skilled in the art.

By way of example, the controller 35 may communicate with the circuitry on the circuit board 72 via wireless (e.g., RF) communication to obtain the feedback data from the position sensor system, and to provide control commands to the gear motor 58 for adjusting the position of the collar 48 to thereby provide scan angle compensation. Power for the circuitry on the circuit board 72, the position sensor system, and the gear motor 58 may be provided by an inductive power interface 82 carried by the scanner stator assembly 37, and a corresponding power interface carried within the rotatable hub 38 (not shown).

Figure 6:
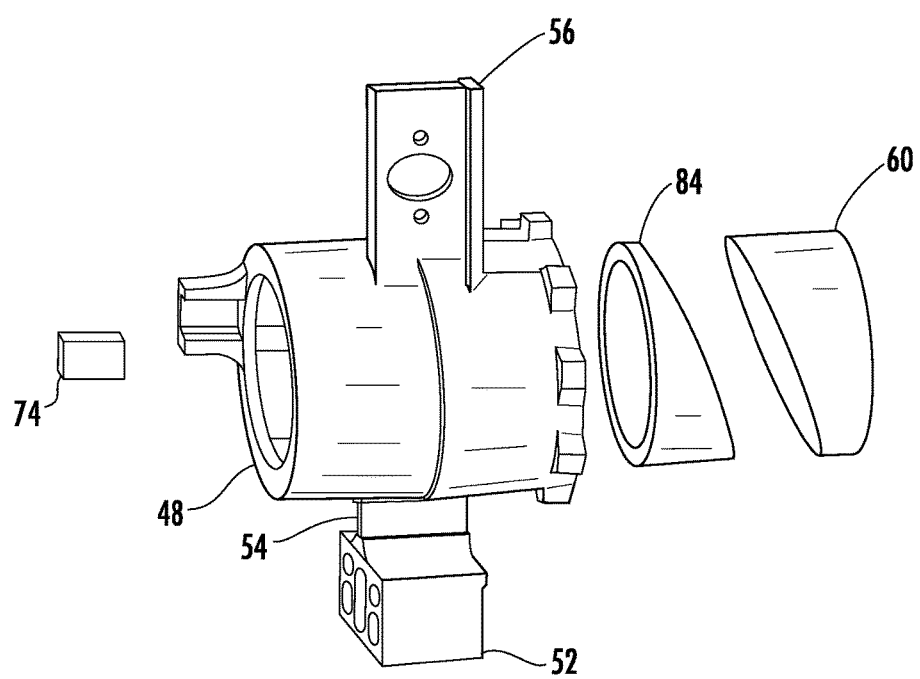
FIG. 6 is an exploded view illustrating positioning of an optical transmission element within a collar of the adjustable optical element mounting fixture of FIG. 4.

Assembly of the transmit OE 60 within the collar 48 is shown in FIG. 6. In the illustrated example, a spacer 84 is positioned within the collar 48, followed by the transmit OE 60 (here a refractive prism). In this embodiment the transmit OE 60 is bonded into the collar 48, although other attachment arrangements may also be used.

As a result of the above-described configuration, the clocking mechanism 40 may advantageously be used to adjust the angular alignment between receive and transmit channels due to changes in angular offset between each optical channel and target, i.e., by rotating the transmit OE in a plane transverse to the rotational axis 44 of the hub 38 to make the adjustment. Moreover, the flexure system advantageously provides frictionless rotation adjustment via the flexure hinge 54 without the need for bearings, etc. Another advantage of the above-described approach is that it allows for dynamic alignment of transmit and receive channels, as well as greater operational flexibility to use faster scan rates and/or at higher altitudes. By way of example, the hub 38 may be rotated at speeds of 1500 RPMs or more. This accordingly allows for an increase in the area collection rate of the system 30 with respect to approaches such as those described above, which in turn may contribute to lower collection costs.

Furthermore, inductively powering the clocking mechanism 40 allows the clocking mechanism to operate on the spinning rotatable hub 38 without the need for slip-rings or cable connections, as will be appreciated by those skilled in the art. As noted above, real-time control of the clocking mechanism 40 may be provided via a low power RF link, thus avoiding the need to install control electronics on a rotating portion of scanner. The system 30 accordingly provides for relatively fast, high precision line-of-sight (LOS) positioning which may be used for various applications such as mapping and visualization.

It should be noted that, while the time of flight (TOF) compensation operations have been described herein with respect to the transmit path (i.e., by adjustment of the position of the transmit OE 60), the compensation operations could instead (or in addition to) be accomplished in the receive path (i.e., through adjustment of a receive OE), as will be appreciated by those skilled in the art. Moreover, since the present approach uses independent transmit/receive apertures, the laser source 33 and laser receiver 34 may be arranged separately, instead of coaxially as discussed above.

A related laser imaging method using the laser imaging system 30 is also provided. The method may include operating the laser source 33 and laser receiver 34, and adjusting the adjustable OE mounting fixture to adjustably move the transmit OE 60 with respect to the rotatable hub 38 in the plane transverse to the rotation axis 44 to thereby provide scan angle compensation between the laser source and laser receiver, as discussed further above.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An imaging system comprising:
a light source;
a light receiver;
a rotatable base defining a rotation axis and configured to revolve about the rotation axis at a plurality of revolutions per minute;
an optical element (OE) carried by said rotatable base in an optical path between said light source and light receiver;
an adjustable OE mounting fixture mounting said OE to be adjustably movable with respect to said rotatable base laterally within a plane transverse to the rotation axis;
a controller configured to adjust said adjustable OE mounting fixture to provide scan angle compensation.

2. The imaging system of claim 1 wherein said OE is aligned along an optical path segment from said light source.

3. The imaging system of claim 1 wherein said light source and said light receiver are in a coaxial arrangement.

4. The imaging system of claim 1 wherein said rotatable base has an opening therein; and wherein said adjustable OE mounting fixture further comprises a collar carried by said rotatable base within the opening thereof and configured to hold the OE therein, and a flexure mount carried by said rotatable base adjacent the opening and coupled to said collar.

5. The imaging system of claim 4 wherein said flexure mount comprises a solid monolithic body having a proximal end coupled to said rotatable base, a distal end coupled to said collar, and an intermediate portion having a reduced thickness providing flexibility for said flexure mount.

6. The imaging system of claim 5 wherein said adjustable OE mounting fixture further comprises:
an arm coupled to said collar opposite said flexure mount; and
an actuator carried by said rotatable base and coupled to said arm.

7. The imaging system of claim 4 further comprising a position sensor system carried by said rotatable base and configured to sense a position of said collar.

8. The imaging system of claim 7 wherein said position sensor system comprises:
a main reflector carried by said collar;
a reference laser carried by said rotatable base for directing a reference laser beam at said main reflector; and
a linear detector array carried by said rotatable base for receiving reflected laser light from said main reflector and coupled to said controller.

9. The imaging system of claim 8 further comprising at least one secondary reflector carried by said rotatable base and in an optical path between said reference laser and said linear detector.

10. The imaging system of claim 1 wherein said light source comprises a laser light source, and wherein said light receiver comprises a laser light receiver.

11. The imaging system of claim 1 further comprising an inductive power interface carried by said rotatable base.

12. A laser imaging system comprising:
a laser source;
a rotatable base defining a rotation axis and configured to revolve about the rotation axis at a plurality of revolutions per minute;
an optical element (OE) carried by said rotatable base in an optical path from said laser source; and
an adjustable OE mounting fixture mounting said OE to be adjustably movable with respect to said rotatable base laterally within a plane transverse to the rotation axis.

13. The laser imaging system of claim 12 wherein said rotatable base has an opening therein; and wherein said adjustable OE mounting fixture further comprises a collar carried by said rotatable base within the opening thereof and configured to hold the OE therein, and a flexure mount carried by said rotatable base adjacent the opening and coupled to said collar.

14. The laser imaging system of claim 13 wherein said flexure mount comprises a solid monolithic body having a proximal end coupled to said rotatable base, a distal end coupled to said collar, and an intermediate portion having a reduced thickness providing flexibility for said flexure mount.

15. The laser imaging system of claim 14 wherein said adjustable OE mounting fixture further comprises:
an arm coupled to said collar opposite said flexure mount; and
an actuator carried by said rotatable base and coupled to said arm.

16. The laser imaging system of claim 12 further comprising a position sensor system carried by said rotatable base and configured to sense a position of said adjustable OE mounting fixture.

17. The laser imaging system of claim 16 wherein said position sensor system comprises:
a main reflector carried by said collar;
a reference laser carried by said rotatable base for directing a reference laser beam at said main reflector; and
a linear detector array carried by said rotatable base for receiving reflected laser light from said main reflector and coupled to said controller.

18. The laser imaging system of claim 17 further comprising at least one secondary reflector carried by said rotatable base and in an optical path between said reference laser and said linear detector.

19. The laser imaging system of claim 12 further comprising an inductive power interface carried by said rotatable base.

20. The imaging system of claim 12 further comprising a laser receiver in a coaxial arrangement with said laser source.

21. A method for using an imaging system comprising a light source, a light receiver, a rotatable base defining a rotation axis, an optical element (OE) carried by the rotatable base in an optical path between the light source and light receiver, and an adjustable OE mounting fixture mounting the OE to be adjustably movable with respect to the rotatable base in a plane transverse to the rotation axis, the method comprising:
operating the light source and light receiver;
rotating the rotatable base to revolve about the rotation axis at a plurality of revolutions per minute; and
adjusting the adjustable OE mounting fixture to adjustably move the OE with respect to the rotatable base laterally within the plane transverse to the rotation axis to thereby provide scan angle compensation between the light source and light receiver.

22. The method of claim 21 wherein the rotatable base has an opening therein; and wherein the adjustable OE mounting fixture further comprises a collar carried by the rotatable base within the opening thereof and configured to hold the OE therein, and a flexure mount carried by the rotatable base adjacent the opening and coupled to the collar.

23. The method of claim 22 wherein the flexure mount comprises a solid monolithic body having a proximal end coupled to the rotatable base, a distal end coupled to the collar, and an intermediate portion having a reduced thickness providing flexibility for the flexure mount.

24. The method of claim 23 wherein the adjustable OE mounting fixture further comprises an arm coupled to the collar opposite the flexure mount, and an actuator carried by the rotatable base and coupled to the arm.

25. The method of claim 22 wherein the imaging system further comprises a position sensor system carried by the rotatable base; and further comprising using the position sensor system to sense a position of the adjustable OE mounting fixture.

26. The method of claim 25 wherein the position sensor system comprises:
a main reflector carried by the collar;
a reference laser carried by the rotatable base for directing a reference laser beam at the main reflector; and
a linear detector array carried by the rotatable base for receiving reflected laser light from the main reflector and coupled to the controller.

27. The method of claim 21 wherein the light source comprises a laser light source, and wherein the light receiver comprises a laser light receiver.

28. The method of claim 21 wherein the light source and the light receiver are in a coaxial arrangement.

* * * * *